(12) United States Patent
Sano (10) Patent No.: US 8,226,133 B2
(45) Date of Patent: Jul. 24, 2012

(54) BUMPER ATTACHMENT DEVICE

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 253 days.

(21) Appl. No.: 12/639,127

(22) Filed: Dec. 16, 2009

(65) Prior Publication Data

US 2010/0187841 A1 Jul. 29, 2010

(30) Foreign Application Priority Data

Dec. 17, 2008 (JP) ................................ 2008-321010

(51) Int. Cl.
*B60R 19/38* (2006.01)

(52) U.S. Cl. ............... 293/155; 293/121; 296/193.09; 296/29

(58) Field of Classification Search ............... 293/102, 293/121, 155; 296/193.08, 193.09, 198, 296/191, 29

See application file for complete search history.

(56) References Cited

U.S. PATENT DOCUMENTS

| | | | | |
|---|---|---|---|---|
| 4,373,826 A * | 2/1983 | Inamoto et al. | ............... | 403/14 |
| 4,875,728 A * | 10/1989 | Copp et al. | .................... | 293/126 |
| 5,915,767 A * | 6/1999 | Hosoda et al. | ............... | 293/126 |
| 6,003,933 A * | 12/1999 | Rinklin | ......................... | 296/198 |
| 6,010,169 A * | 1/2000 | Cox et al. | ...................... | 293/120 |
| 6,135,517 A * | 10/2000 | Cordebar | ....................... | 293/155 |
| 6,435,602 B1 * | 8/2002 | Sukegawa et al. | ............ | 296/191 |
| 6,520,553 B2 * | 2/2003 | Muramatsu | ................... | 293/155 |
| 6,997,491 B2 * | 2/2006 | Takahashi | ...................... | 293/154 |
| 7,083,207 B2 * | 8/2006 | Matsuzawa | .................... | 293/155 |
| 7,207,617 B2 * | 4/2007 | Pelini | ............................ | 296/29 |
| 7,540,550 B1 * | 6/2009 | Huber et al. | .................... | 296/29 |
| 7,625,021 B2 * | 12/2009 | Naik et al. | ..................... | 293/120 |
| 7,793,998 B2 * | 9/2010 | Matsui et al. | ................. | 293/154 |
| 2005/0062308 A1 * | 3/2005 | Pfister et al. | ................... | 296/29 |

FOREIGN PATENT DOCUMENTS

JP 2004-114715 4/2004

* cited by examiner

*Primary Examiner* — Glenn Dayoan
*Assistant Examiner* — Gregory Blankenship
(74) *Attorney, Agent, or Firm* — Harness, Dickey & Pierce, P.L.C.

(57) ABSTRACT

A bumper attachment device is provided for attaching a bumper to a vehicle body disposed between the body and the bumper. A bumper support which can support the bumper and an attachment insert that can be rotatably attached to a securing part secured to the body are provided. The attachment insert has an insertion part inserted into and through a through hole in the bumper support, the insertion part is inserted into and through the through hole, and the insertion part is turned in the through hole while supporting the bumper support; in this way, a part of the attachment insert is caused to abut a part of the bumper support, and through that abutment, the position of the bumper support relative to the body is adjusted.

12 Claims, 6 Drawing Sheets

BUMPER ATTACHMENT DEVICE

FIELD OF THE INVENTION

The present invention relates to a bumper attachment device disposed between a vehicle body and a bumper for attaching the bumper to the body.

BACKGROUND OF THE INVENTION

One example of a bumper attachment device is disclosed in Japanese Application No. 2004-114715. As disclosed in this publication, bumpers are secured to bumper attachment devices that are secured beforehand to the body of a vehicle, or alternatively, as is well known, are secured to studs, welded to the body of a vehicle.

However, discrepancies sometimes develop in the positions of the bumper attachment devices or in the positions where the studs are welded on the bodies, so that when a bumper is attached after such discrepancy has developed, there is a possibility that the disposition of the bumper relative to the body will shift, or, in other words, that the dimensions of the line between the body 11 and the bumper 13 (gap in the up-down direction of the vehicle) or planar position of the bumper (position in left-right direction of vehicle) will no longer match.

An object of the present invention, devised for the purpose of solving the problems in the prior art, is to provide a bumper attachment device that will facilitate managing gaps and the like between bodies and bumpers when bumpers are attached.

SUMMARY OF THE INVENTION

Based on one embodiment of the present invention, a bumper attachment device is provided that is a bumper attachment device disposed between the body of a vehicle and a bumper to attach the bumper to the body, comprising a bumper support that can support the bumper and an attachment insert that is rotatably attached to a securing part secured to the body; wherein the attachment insert has an insertion part that is inserted into and through a through hole in the bumper support; by inserting the insertion part into and through the through hole and turning the insertion part in the through hole while supporting the bumper support, part of the attachment insert is made to abut part of the bumper support, and through that abutment, the position of the bumper support relative to the body is adjusted.

In the device described above, at least two through holes may be provided in the bumper support, and the attachment inserts inserted through those through holes.

Elastic tongue pieces may also be provided for expanding the diameters of the insertion parts in the outer surface of the insertion parts so that by pressing those elastic tongue pieces against the through holes, the attachment inserts may be provisionally latched in the bumper support.

Furthermore, protuberances that can impact against the body may be provided at the upper parts of the gaps, protruding to the outside of the bumper support.

In the device described above, moreover, thick-walled parts for expanding the diameters of the insertion parts may be provided in a part of the outer surface of the insertion parts, the through holes may be made to have substantially the same diameters and the same shapes as the insertion parts which have the thick-walled parts, and together therewith, gaps may be provided in parts above the through holes, which sandwich thin-walled elastic displacement parts; in this way, by turning the insertion parts in the through holes when the insertion parts have been inserted in and through the through holes, the thick-walled parts and the elastic displacement parts may be caused to abut, through which abutment the elastic displacement parts will be pushed away in a direction whereby they become more distant from the thick-walled parts in the axial direction of the attachment inserts, and the position of the bumper support relative to the body will be adjusted.

In the device described above, provision may be made so that protrusions are provided in flanges provided about the peripheries of the insertion parts, protruding to the bumper support side, corresponding protrusions are provided about the peripheries of the through holes in the bumper support, protruding to the attachment insert side so that by rotating the insertion parts in the through holes when the insertion parts have been inserted into and through the through holes, the protrusions and the corresponding protrusions are caused to abut, through which abutment the bumper support is pushed away to the body side, and the position of the bumper support relative to the body is adjusted.

In the device described above, the corresponding protrusions of the bumper support may be formed in a sloping shape.

In the device described above, moreover, the elastic tongue pieces and the thick-walled parts may be removed approximately 90 degrees from the direction of rotation of the attachment inserts.

Furthermore, provision may be made so that securing means extending in the axial direction toward the turning axes of the attachment inserts are provided in the insertion parts, and so that using these securing means, the attachment inserts are rotatably attached to the securing parts.

In the device described above, moreover, the securing means may comprise a pair of elastic latching pieces that are removed approximately 180 degrees from the direction of turning of the attachment inserts; a pair of securing pieces are removed approximately 180 degrees from the direction of turning of the attachment inserts, and the pair of elastic latching pieces and the pair of securing pieces may be removed approximately 90 degrees from the direction of turning of the attachment inserts.

Based on the present invention, the position of a bumper attachment device relative to a vehicle body can be optimized without being affected by discrepancies in stud positions or heights.

BRIEF DESCRIPTION OF THE DRAWINGS

FIGS. 2(a) and (b) are perspective views of an attachment insert of the present invention.

FIGS. 4(a)-(e) are a set of detailed drawings of a bumper support of the present invention.

FIGS. 5(a)-(c) are a set of section drawings representing a provisionally assembled condition.

FIGS. 6(a)-(c) are a set of section drawings representing a finally assembled condition.

DETAILED DESCRIPTION OF THE PREFERRED EMBODIMENTS

A preferred embodiment of a bumper attachment device based on the present invention shall now be described with reference to the attached drawings.

Figure 1:
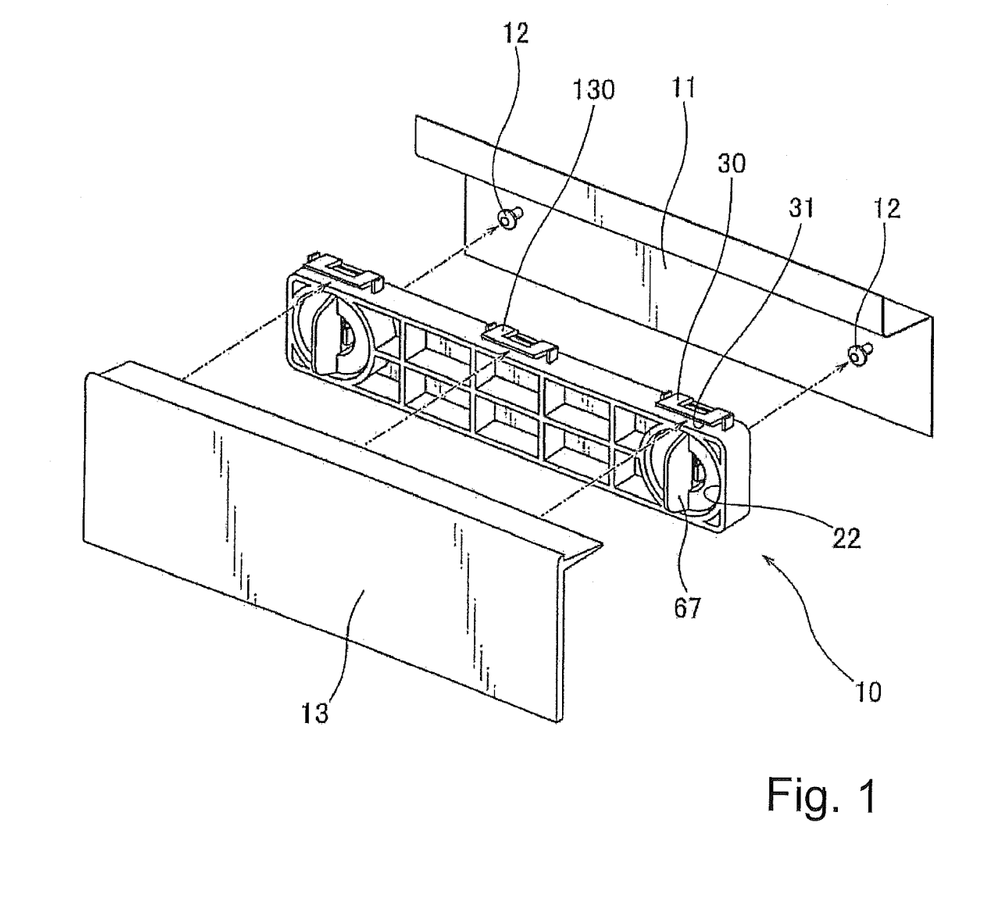
FIG. 1 is a perspective view showing a bumper attachment device in accordance with the present invention, together with other components.

In FIG. 1, a diagonal view of a bumper attachment device is shown based on the present invention, together with a bumper attaching retainer 10, a vehicle body 11 and a bumper 13.

When attaching the bumper 13, the bumper attachment device 10 is disposed between the vehicle body 11 and the bumper 13. Describing it further, the bumper attachment device 10 is secured to the body 11 with the use of studs (securing parts) 12 welded beforehand to the body 11, and the bumper 13 is attached to the bumper attachment device 10 secured to the body 11.

As is evident, the bumper 13 is only indirectly secured to the body 11, that is, secured only through the bumper attachment device 10.

For that reason, by suitably positioning the bumper attachment device 10 relative to the body 11, the bumper 13 secured to the bumper attachment device 10 can be suitably positioned relative to the body 11.

Figure 2:
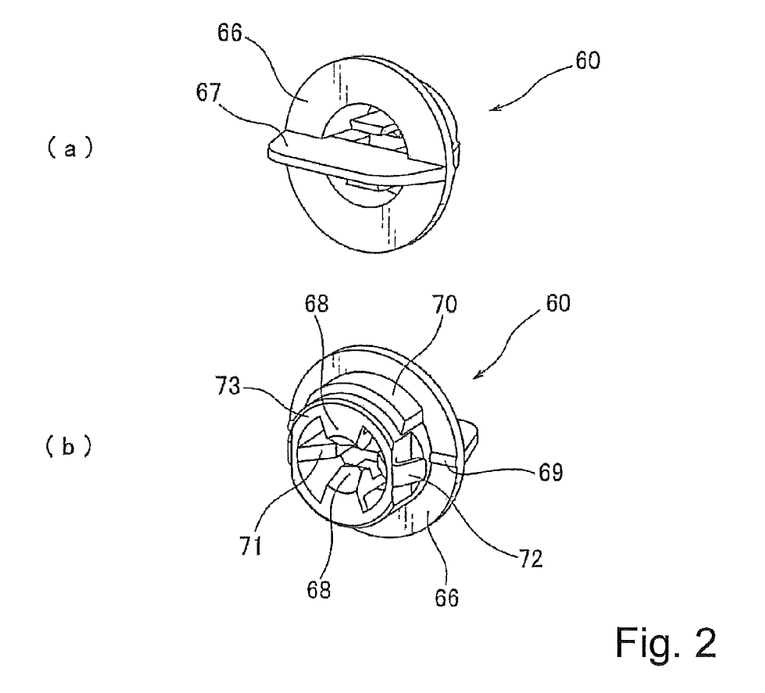
Figure 3:
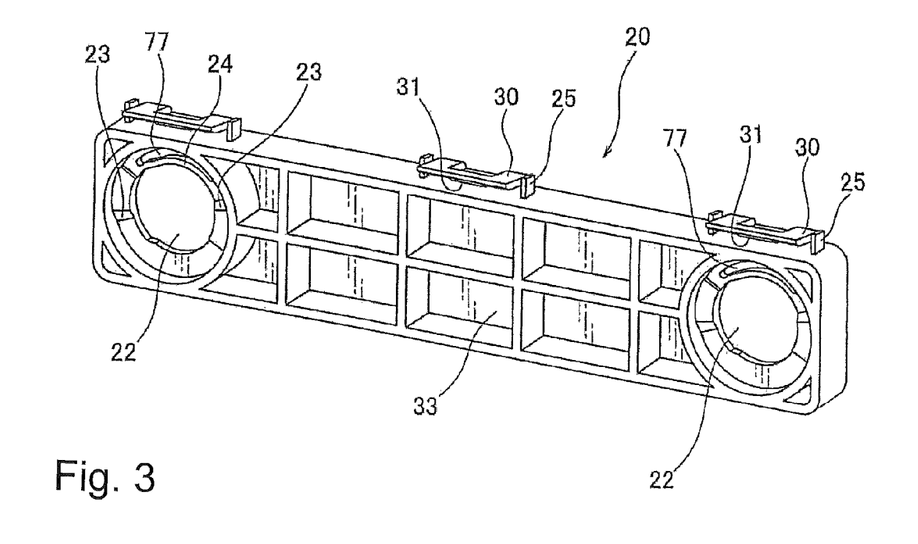
FIG. 3 is a perspective view of a bumper support of the present invention.

To facilitate the positioning of the bumper attachment device 10 relative to the body 11, the bumper attachment device 10 comprises two configuring components. These are the attachment insert shown in FIG. 2, that is, a knob 60, on the one hand, and, on the other, the bumper support shown in FIG. 3, that is, a retainer body 20. In FIGS. 2 and 3, these configuring components are represented in diagonal views which are individual component drawings. In FIG. 2, furthermore, the attachment insert 60 is represented in a front perspective view (FIG. 2a) and in a back perspective view (FIG. 2b).

The attachment insert 60 has an insertion part 73 that is substantially cylindrical, a ring-shaped flange 66 provided so as to enclose the periphery of that insertion part 73 and, in addition, a gripping piece 67 that extends to the fore of the flange 66. The insertion part 73 is a part that is inserted into and through a knob attachment hole (through hole) 22 of the retainer body 20, while the gripping piece 67 is a part for turning the insertion part 73 relative to the retainer body 20.

Figure 4:
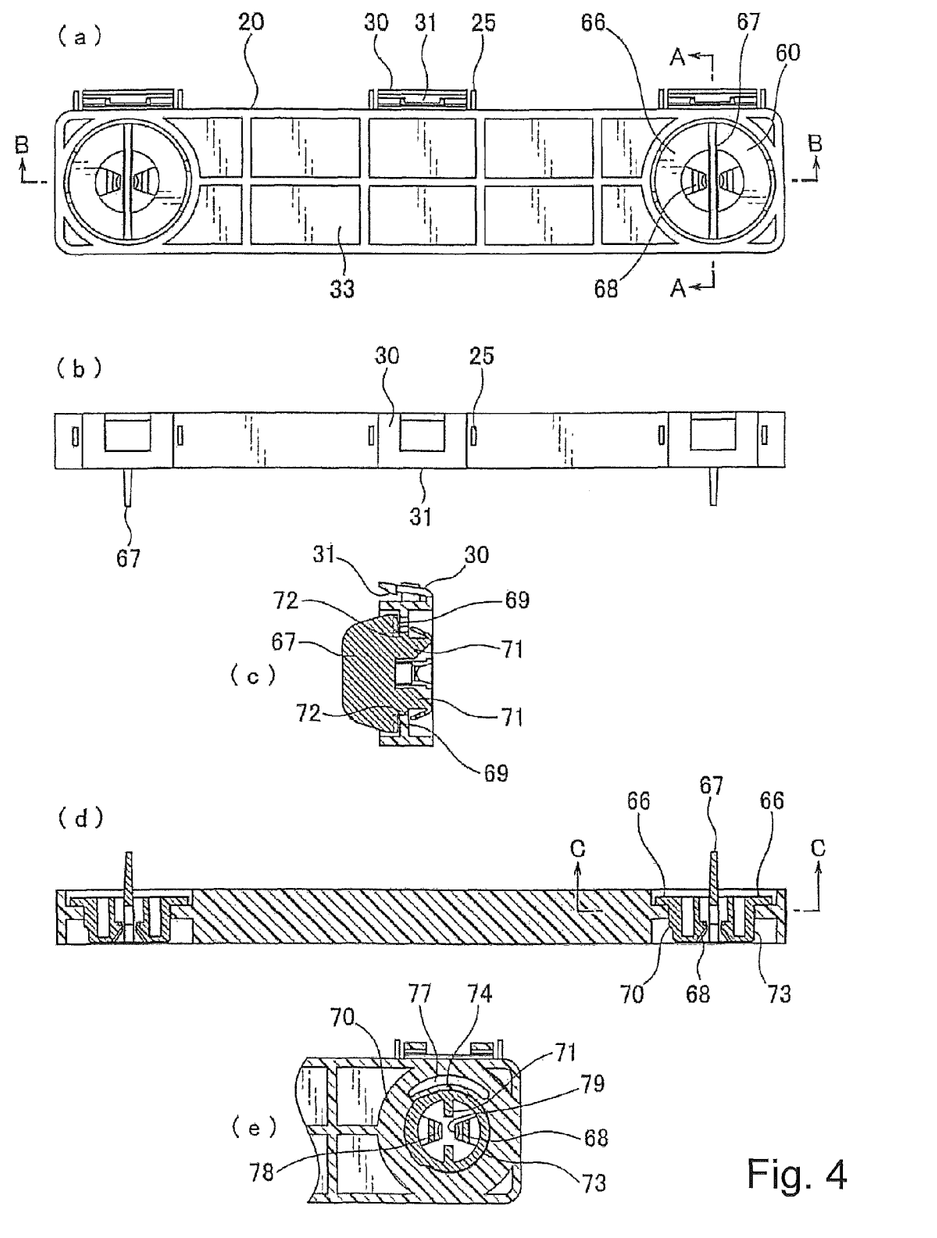

When attaching the bumper attachment device 10 to the body 11, first the bumper attachment device 10 is configured in the condition shown in FIG. 4, that is, in a provisionally assembled condition. FIG. 4a is a front elevation of the bumper attachment device 10 in the provisionally assembled condition, FIG. 4b is a top view thereof, FIG. 4c is a section at the A-A line in FIG. 4a, FIG. 4d is a section at the B-B line in FIG. 4a, and FIG. 4e is a section at the C-C line in FIG. 4d.

In order to effect the provisionally assembled condition, attachment inserts 60 are inserted, respectively, into two through holes 22 provided in the bumper attachment device 20. In the cylindrical outer surface of the insertion part 73, a provisional assembly pawl (elastic tongue piece) 72 is provided for expanding the diameter of the insertion part 73. When the insertion part 73 has been inserted into and through a through hole 22 in the bumper attachment device 20, the elastic tongue piece 72 is pressed against the through hole 22, and the attachment insert 60 is provisionally latched to the bumper attachment device 20. Consequently, the attachment insert 60 stops at the position indicated in FIG. 4 relative to the bumper attachment device 20, which means that the provisionally assembled condition is effected. The provisionally assembled condition is released when the attachment insert 60 (insertion part 73) is turned relative to the bumper attachment device 20, so that a finally assembled condition is effected.

In the cylindrical outer surface of the insertion part 73, furthermore, a vehicle height-direction adjustment abutting piece (thick-walled part) 70 is provided for expanding the diameter of the insertion part 73. The thick-walled part 70 from the elastic tongue piece 72 is in a position that is removed approximately 90 degrees from the direction of turning of the attachment insert 60. When the insertion part 73 has been inserted into and through a through hole 22, by turning the insertion part 73 in the provisionally assembled condition shown in FIG. 4 in the through hole 22, the thick-walled part 70 and a vehicle up-down direction adjusting elastic piece (elastic displacement part) 74 of the bumper attachment device 20 are made to abut. Provision is thus made so that through that abutment, the position of the bumper attachment device 20 relative to the body 11 can be adjusted.

On one of the flange 66 enclosing the insertion part 73, which is to say on the side where the insertion part 73 is provided, ribs (protrusions) 69 are provided which can protrude to the bumper attachment device 20 side when securing the device to the body 11. The protrusions 69 are provided in a total number of two, one at either coaxial opposing position sandwiching the insertion part 73. By turning the insertion part 73 that is in the provisionally assembled condition shown in FIG. 4 in the through hole 22 when the insertion part 73 has been inserted into and through the through hole 22, these protrusions 69 are caused to abut against vehicle left-right direction adjusting slopes (corresponding protrusions) 23 of the bumper attachment device 20. Provision is thus made so that through that abutment, the bumper attachment device 20 is pushed away to the body 11 side, and the position of the bumper attachment device 20 relative to the body 11 can be adjusted. The protrusions 69, furthermore, need not necessarily be provided in the flange 66, but may instead be provided so that they protrude on the bumper attachment device 20 side at the periphery of the insertion part 73 of the attachment insert 60.

In the interior of the insertion part 73, securing means 68 and 71 are provided for rotatably attaching the attachment insert 60 to a stud 12 secured to the body 11. These securing means 68 and 71 extend in the radial direction toward the turning axis of the attachment insert 60. These securing means 86 and 71 are classified in two types. One type consists of a pair of stud securing pawls (elastic latching pieces) 68 provided at coaxial opposing positions removed approximately 180 degrees from the direction of turning of the attachment insert 60, while the other consists of a pair of stud holding ribs (securing pieces) 71 provided in the same way. These means, namely the pair of elastic latching pieces 68 and the pair of securing pieces 71, are removed approximately 90 degrees from the direction of turning of the attachment insert 60. The securing pieces 71 function to limit to some extent the position of the attachment insert 60 relative to the stud 12, while the elastic latching pieces 68 have the function of elastically latching the attachment insert 60 that is positionally limited by the securing pieces 71, to the stud 12. Using these two types of means, the attachment insert 60 can be rotatably and elastically attached to a stud 12 secured to the body 11. Once the bumper attachment device 10 is attached to the securing parts 12 on the body 11, moreover, stud flanges 15 will abut latching surfaces 78 of the elastic latching pieces 68, and in this way, the attachment insert 60 will be prevented from falling out. In order to maintain this abutment with the stud flanges 15, indentations 79 corresponding to the shape of the studs may be provided in the latching surfaces 78 (cf. FIG. 4e).

The bumper attachment device 20 is formed as a rectangular frame having a prescribed thickness. In order to enhance the strength thereof, a plurality of chambers 33 is formed near the center of the frame. Through holes 22 are provided on both ends of the frame in a total number of two, that is, one at each end for attaching the attachment inserts 60. A part 73 of the attachment insert 60 is inserted into and through these through holes 22.

The through hole 22 is made to have substantially the same diameter and same shape as the insertion part 73 of the attachment insert 60 with the thick-walled part 70 so that the insertion part 73 can be inserted into and through that through hole 22. In one part above the through hole 22, a gap 77 is provided, sandwiching the thin-walled elastic displacement part 74. By turning the insertion part 73 that is in the provisionally assembled condition shown in FIG. 4 in the through hole 22, after the insertion part 73 has been inserted into and through the through hole 22, the thick-walled part 70 is moved downward from the gap 77, the thick-walled part 70 and the elastic displacement part 74 of the bumper attachment device 20 are caused to abut, and through that abutment, the position of the bumper attachment device 20 relative to the body 11 can be adjusted.

At the periphery of the through hole 22, vehicle left-right direction adjusting slopes (corresponding protrusions) 23 that protrude on the attachment insert 60 side are provided. The slopes 23 are members that correspond to the protrusions 69 of the attachment insert 60. By turning the insertion part 73 that is in the provisionally assembled condition shown in FIG. 4 in the through hole 22, after the insertion part 73 has been inserted into and through the through hole 22, the protrusions 69 are caused to abut against the slopes 23 and through that abutment, the position of the bumper attachment device 20 relative to the body 11 can be adjusted. When the corresponding protrusions 23 are made sloped shapes as in this embodiment, very small adjustments can be made by applying force gradually to the bumper attachment device 20.

Figure 5:
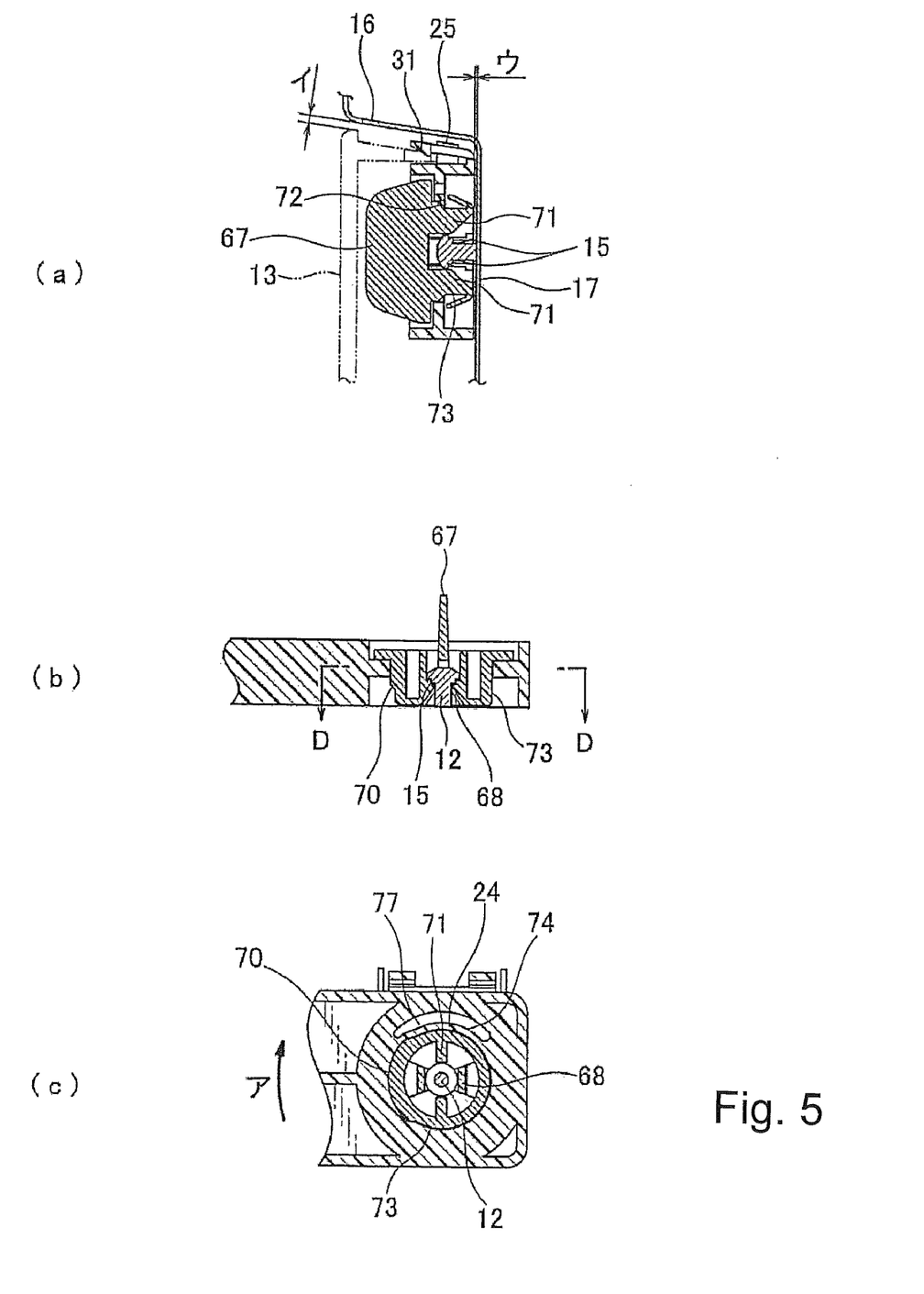
Figure 6:
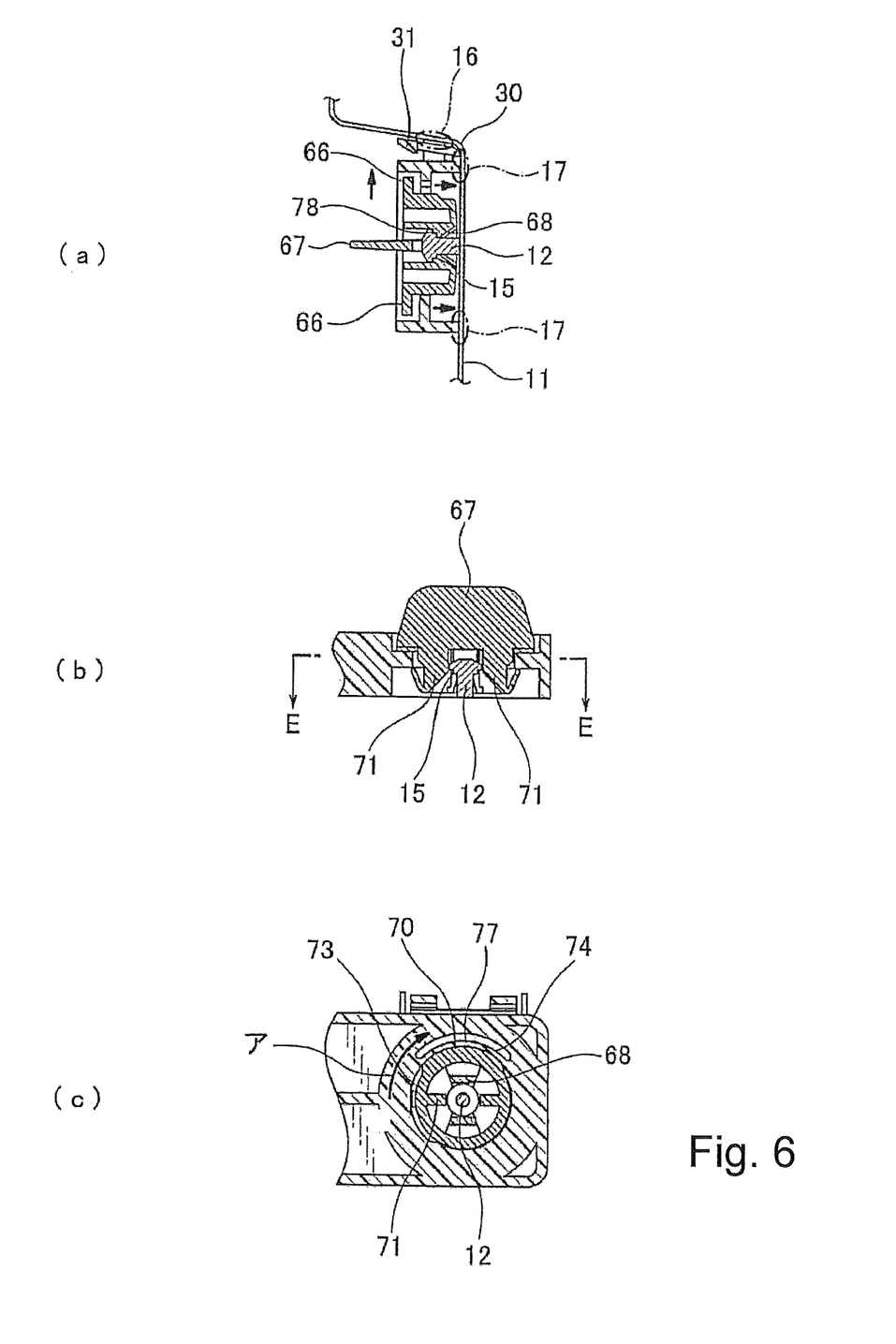

The action of the bumper attachment device shall now be described with reference to FIGS. 5 and 6. FIGS. 5 and 6, respectively, show the provisionally assembled condition and the finally assembled condition. Here, FIG. 5a is a section corresponding to FIG. 4c, FIG. 5b is a section corresponding to FIG. 4d, and FIG. 5c is a section corresponding to FIG. 4e, being a section at the D-D line in FIG. 5b. Similarly, FIG. 6a is a section corresponding to FIG. 4c, FIG. 6b is a section corresponding to FIG. 4d, and FIG. 6c is a section corresponding to FIG. 4e, being a section at the E-E line in FIG. 6b. The sections in FIGS. 6a, 6b, and 6c, moreover, correspond to FIGS. 5a, 5b, and 5c.

By a comparative study of FIGS. 5 and 6, the positional conditions in the provisionally assembled condition and finally assembled condition become clear. The attachment insert 60 and bumper attachment device 20 shown in FIG. 5 can, by turning the attachment insert 60 (insertion part 73) in the direction of the indicated arrow "A" relative to the bumper attachment device 20, be configured in the finally assembled condition shown in FIG. 6, that is, in a condition so that the bumper attachment device 20 is completely secured to the body 11 while the position of the bumper attachment device 20 relative to the body 11 is being adjusted.

In case there is a discrepancy in the precision of the welded position of a stud 12 secured to a vehicle body 11, for example, as is well illustrated in FIG. 5a in the provisionally assembled condition, the dimensions of the line between the body 11 and the bumper 13 will sometimes not correspond with the gap in the up-down direction of the vehicle (indicated by "B" in FIG. 5a) or with the planar position, that is, with its position in the left-right direction of vehicle (indicated by "C" in FIG. 5a).

However, as shown in FIG. 5, by turning the attachment insert 60 in the "A" direction after the bumper attachment device 10 has been provisionally attached to a stud 12 on the body 11, using the elastic latching pieces 68 and securing pieces 71, the protrusions 69 are caused to abut the slopes 23 in the left-right direction of the vehicle, and through that abutment, the bumper attachment device 20 can be pushed to the vehicle left-right direction control surface 16 side of the body 11, while also in the up-down direction of the vehicle, the thick-walled part 70 is moved downward from the gap 77, the thick-walled part 70 and the elastic displacement parts 74 of the bumper attachment device 20 are caused to abut, and through that abutment, the elastic displacement parts 74 are pushed away in a direction so that they become more distant from the thick-walled part 70 in the radial direction of the attachment insert 60, the bumper attachment device 20 is pushed up higher on the vehicle by the outer diameter 70 of the attachment insert 60 that has a different diameter, and the bumper attachment device 20 can be pushed to the side of a vehicle up-down direction control surface 17. At the top of the gap 77, moreover, a height-direction abutting rib (protuberance) 25 that can impact against the body 11 is provided, protruding to the outside of the bumper attachment device 20, and the body 11 is arranged such that it is always impacted against this protuberance 25. Furthermore, because the gap 77 and the elastic displacement parts 74 will be deformed after the body 11 and this protuberance 25 have impacted, turning the attachment insert 60 further will have been made possible, and in this way, it will be possible to absorb the positional discrepancy of the stud 12 and make adjustments consistently. Thus, the bumper attachment device 10 is of such a structure that the bumper attachment device 20 can be pushed on the body 11 in the vehicle left-right direction or in the vehicle up-down direction. Consequently, the position of the bumper attachment device 20 relative to the body 11 can be optimized without being affected by discrepancies in the position or height of the stud 12. Based on the present invention previously as described, welding position discrepancies can be absorbed, and the line between the bumper 13 and the body 11, that is, the gap between the body 11 and the bumper 13, can be controlled so as to always be constant.

Figure 7:
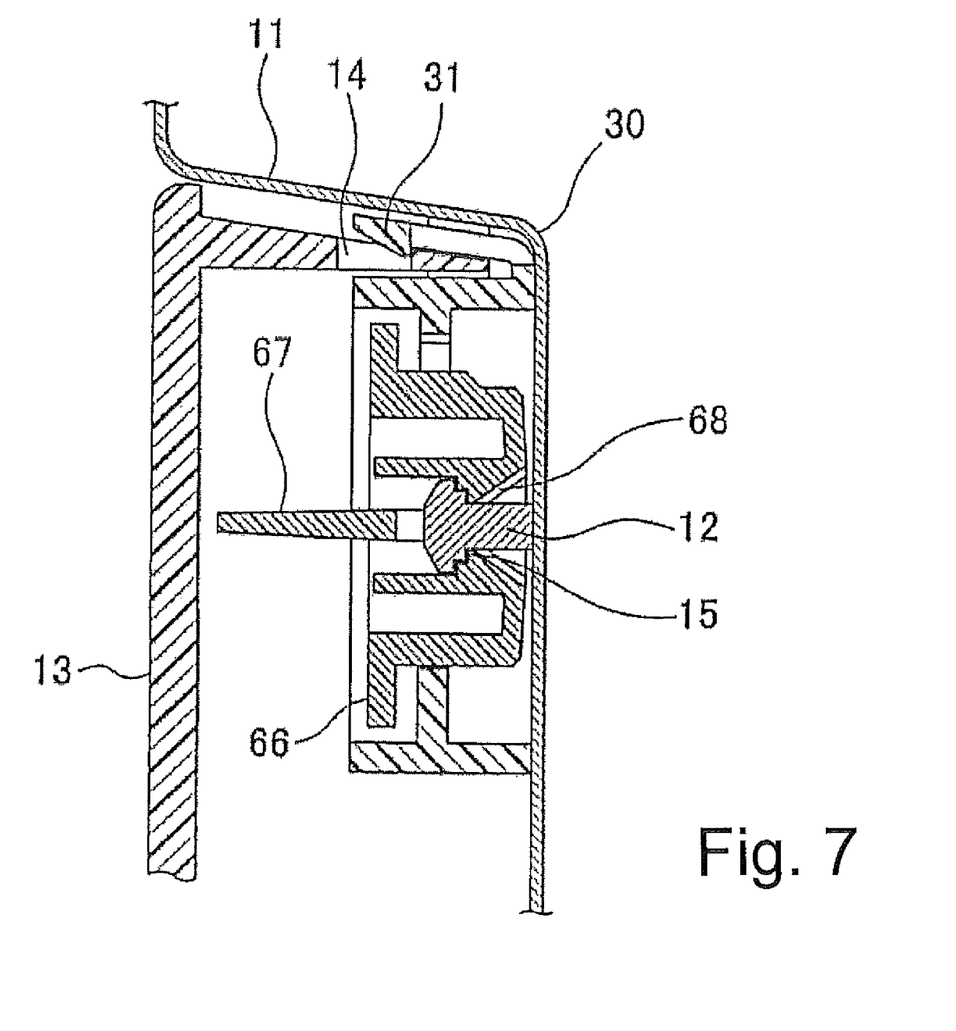
FIG. 7 is a section representing a bumper attachment method.

Finally, the method of attaching the bumper 13 is described with reference to the section shown in FIG. 7. FIG. 7 shows the bumper attachment device 10 by the same method as shown in FIG. 5a and FIG. 6a. After attaching the bumper attachment device 10 in a desired position on the body 11, the bumper 13 can be supported. For example, a latching pawl 31 extending downward is provided at the tip end of an elastic displacement part 30 provided in the upper side surface of the bumper attachment device 20. By engaging this latching pawl 31 in a latching hole 14 provided in the bumper 13, the bumper 13 can easily be attached to the bumper attachment device 20 and supported.

What is claimed is:

1. A bumper attachment device disposed between a vehicle body and a bumper to attach said bumper to said body, comprising:

a bumper support connected to said bumper for supporting the bumper; and an attachment insert inserted into a through hole in said bumper support and attached to a securing part secured to said body;

said attachment insert having a first part thereof configured to engage a respective first portion of said bumper support adjacent to said through hole when said attachment insert is rotated relative to said bumper support, such that the action of said first part of said attachment insert engaging said first portion of said bumper support upon rotation of said attachment insert causing the position of said bumper support, and hence the position of the bumper connected thereto, to move relative to said vehicle body in one of the up/down and left/right directions.

2. The bumper attachment device of claim 1, wherein one of said first part of said attachment insert and said first portion of said bumper support comprises a sloped surface so that the amount of movement of said bumper support relative to said vehicle body varies with the degree of rotation of said attachment insert relative to said bumper support.

3. The bumper attachment device of claim 1, wherein said attachment insert has an insertion part that is configured to extend into and through the through hole in said bumper support.

4. The bumper attachment device according to claim 3, wherein at least two through holes are provided in said bumper support, and an attachment insert is inserted through each of said through holes.

5. The bumper attachment device according to claim 4, wherein elastic tongue pieces are provided for expanding the diameters of the insertion parts in an outer surface of said insertion parts, and by pressing these elastic tongue pieces against said through holes, said attachment inserts are provisionally latched in said bumper support.

6. The bumper attachment device according to claim 4, wherein:
   thick-walled parts for expanding the diameters of the insertion parts are provided in a part of an outer surface of said insertion parts; said through holes are made to have substantially the same diameters and the same shapes as said insertion parts with said thick-walled parts, and gaps are provided together therewith in portions above said through holes, sandwiching thin-walled elastic displacement parts; whereupon,
   by turning said insertion parts in said through holes when said insertion parts have been inserted in and through said through holes, said thick-walled parts engage said elastic displacement parts causing the position of said bumper support relative to said body to be adjusted in the up/down direction.

7. The bumper attachment device according to claim 4, wherein said attachment insert further comprises protuberances configured to engage sloped surfaces on said bumper support adjacent said through holes.

8. The bumper attachment device according to claim 7, wherein:
   protrusions are provided in flanges provided about the peripheries of said insertion parts, protruding to the bumper support side;
   corresponding sloped surfaces are provided about the peripheries of the through holes in said bumper support on the attachment insert side; and
   by rotating said insertion parts in said through holes when said insertion parts have been inserted into and through said through holes, said protrusions engage said corresponding sloped surfaces causing the position of said bumper support relative to said body to be adjusted in the right/left direction.

9. The bumper attachment device according to claim 6, elastic tongue pieces are provided for expanding the diameters of the insertion parts in an outer surface of said insertion parts, and by pressing these elastic tongue pieces against.

10. The bumper attachment device according to claim 9, wherein said elastic tongue pieces and said thick-walled parts are spaced apart approximately 90 degrees relative to the direction of rotation of said attachment inserts.

11. The bumper attachment device according to claim 3, wherein said insertion part includes securing means that engage said securing part to attach said attachment insert to said securing part when said attachment insert is rotated.

12. The bumper attachment device according to claim 11, wherein said securing means comprises a pair of elastic latching pieces spaced apart approximately 180 degrees relative to the direction of rotation of said attachment inserts; a pair of securing pieces spaced apart approximately 180 degrees relative to the direction of rotation of said attachment inserts; and said pair of elastic latching pieces and said pair of securing pieces are spaced apart approximately 90 degrees relative to the direction of rotation of said attachment inserts.

* * * * *